Feb. 16, 1965 L. KIRAMIDJIAN 3,169,400
LIQUID LEVEL RECORDING APPARATUS
Filed Nov. 2, 1962 2 Sheets-Sheet 1
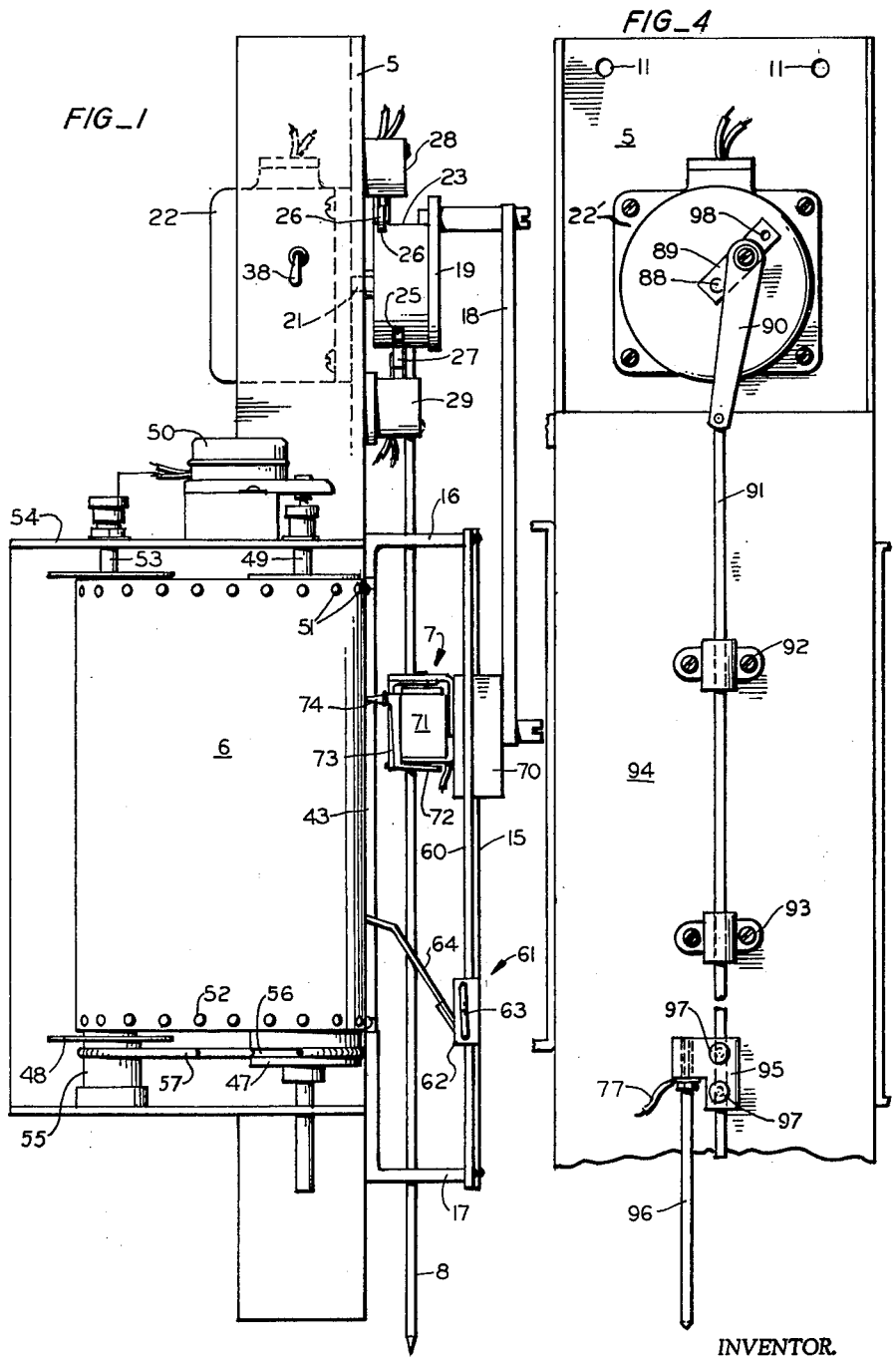
INVENTOR.
LUDWIG KIRAMIDJIAN
BY
Boyken, Mohler & Foster
ATTORNEYS

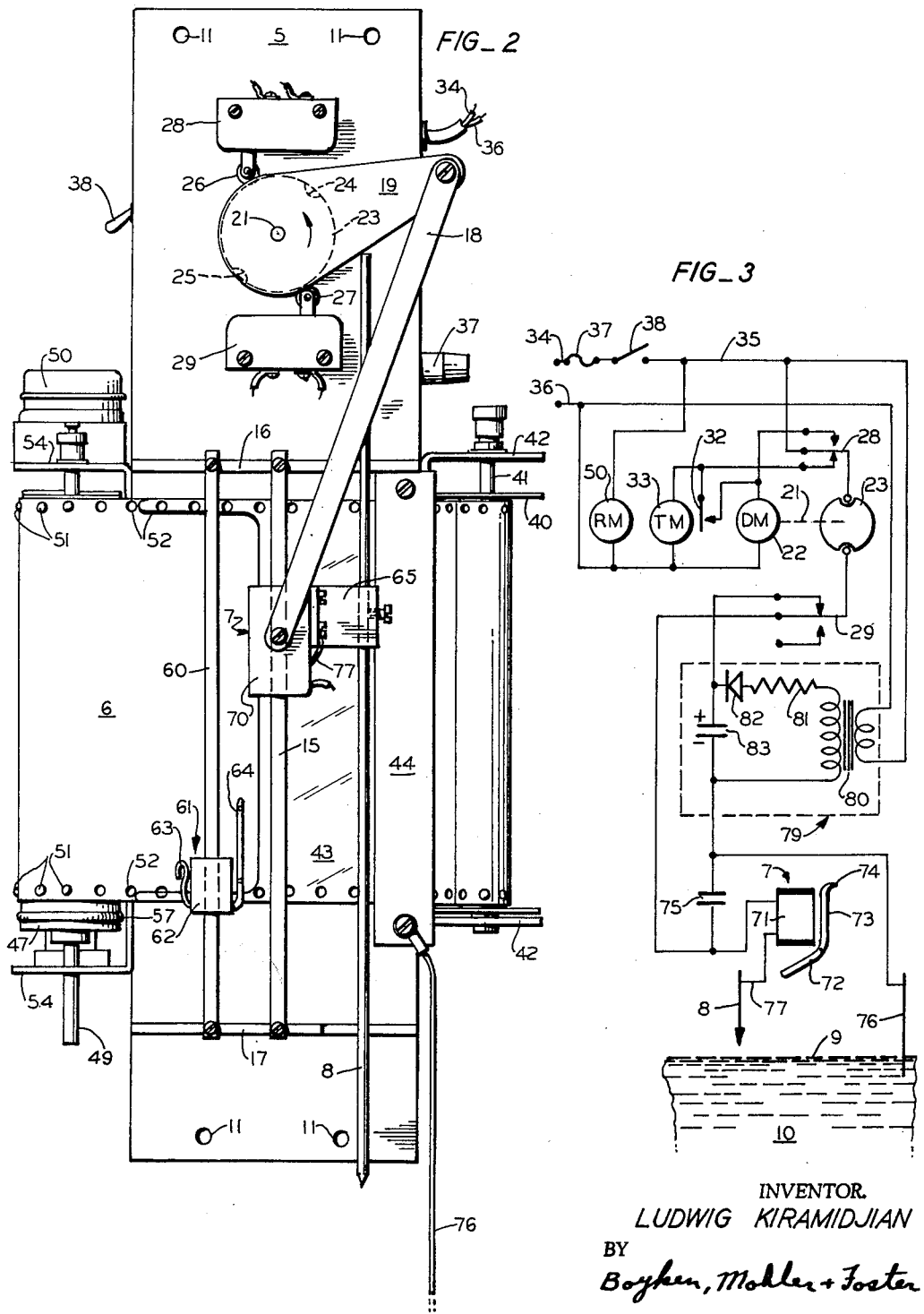

United States Patent Office 3,169,400
Patented Feb. 16, 1965

3,169,400
LIQUID LEVEL RECORDING APPARATUS
Ludwig Kiramidjian, 599 40th Ave.,
San Francisco, Calif.
Filed Nov. 2, 1962, Ser. No. 235,058
13 Claims. (Cl. 73—290)

This invention relates to apparatus for recording the level of a body of liquid, and more particularly to apparatus for recording the variation with time of the level of a body of liquid at a particular location.

Heretofore, in liquid level recording devices, the motion of the probe or other device for detecting the level of a liquid has been dependent upon the actual level of said liquid. That is, the probe is required to approach the level of said liquid and stop moving when at said level. To cause such motion of the probe, such devices usually employ a servomechanism or equally complex mechanism to halt the probe when the desired level is reached. Consequently, such devices are usually heavy and bulky and require relatively frequent maintenance, making provision for portability difficult or practically impossible.

This invention contemplates the use of a probe which oscillates between two predetermined positions. Except for the original choice of said two positions, the motion of the probe is independent of the liquid level being recorded and thus relatively simple, reliable and lightweight apparatus may be used to move the probe. Since the means disclosed below for detecting and recording said liquid level is also reliable and relatively light in weight, the device of this invention may be left unattended at remote locations, being visited only periodically for the removal of the record therefrom and replacement of batteries, if they are used to power the device. The device may also be moved readily from one location to another and mountings for various locations may readily be prepared.

Accordingly, it is an object of this invention to provide a relatively lightweight, reliable liquid level recording apparatus which may conveniently be removed from one location to another.

Another object of this invention is to provide liquid level recording apparatus which does not require frequent supervision.

A further object of this invention is to provide liquid level recording apparatus which does not utilize a servomechanism or other similarly complex electronic circuitry.

Yet another object of this invention is to provide liquid level recording apparatus including a probe dipping into and out of said liquid, the motion of which is independent of the actual level of the liquid being recorded, and means for detecting and recording the level at which the probe first touches said liquid while dipping into the same.

Further objects and advantages of this invention will become apparent from the following description and drawings in which:

FIG. 1 is a side elevational view of the preferred embodiment of the device of this invention with its driving arm turned clockwise from its rest position;

FIG. 2 is a front elevational view of the same embodiment with the driving arm in the position shown in FIG. 1;

FIG. 3 is a semischematic diagram showing the electrical circuitry for the preferred embodiment of the device of this invention with the driving arm in its rest position; and FIG. 4 is a fragmentary rear elevational view showing the probe assembly for an alternate form of the invention.

Referring to FIGS. 1 and 2, a vertically extending channel member 5 serves as the frame for the device of this invention. Where portability is desired, an aluminum channel member is preferable because of its lighter weight.

For convenience, down and up will be used in the description to denote directions toward and away from said body and liquid, but it will be understood that use of the words up and down is not to be taken as restricting the scope of this invention or particularly its applicability in gravity free environments such as in space craft.

A recording medium 6 is guided transversely across the exterior surface of the web of channel member 5. Means which will be described subsequently move a marking unit, generally designated 7, and a probe 8 transversely across and in spaced relation from the surface of recording medium 6 and thus parallel to and spaced from the web of member 5.

In operation, the device of this invention is ordinarily held in position over a body of liquid 10 (shown in FIG. 3), the level of whose surface 9 is being recorded, by mounting channel member 5 to a support adjacent liquid 10 such that said member is perpendicularly oriented with respect to surface 9. Mounting holes 11 are provided at each end of channel member 5 for use in attaching the device of this invention to any suitable support. During a recording cycle, marking unit 7 is moved or oscillated from the upper edge of recording medium 6 to the lower edge and then back to the upper edge. Simultaneously, probe 8 moves down, striking surface 9 at some point in its downward travel, and then back up again to a retracted position above surface 9.

As probe 8 first contacts surface 9, marking unit 7 makes a small dot or mark on the surface of recording medium 6. Recording medium 6 travels a slight distance transversely across member 5 between recording cycles. Thus a chain of dots is produced on recording medium 6 which graphically indicates the variation of the level of surface 9 with respect to time.

Describing the elements of this invention in greater detail, marking unit 7 is slidably mounted on a guide rod 15 (FIG. 2). Guide rod 15 is supported in parallel spaced relation to channel member 5 and transversely of recording medium 6 by a pair of angle members 16, 17. Members 16, 17 are mounted to the exterior surface of channel member 5, on either side of and parallel to recording medium 6.

A connecting rod 18 connects marking unit 7 with a rotating driver or crank arm 19 for translation of rotational motion of driver arm 19 into up and down reciprocable movement of marking unit 7 along guide rod 15.

Elements 7, 15, 18 and 19 together constitute a conventional slider-crank mechanism. The invention also contemplates the use of other mechanisms such as the eccentric and rod mechanism or Scotch yoke mechanism for translating rotational motion of a driver into oscillatory motion of marking unit 7.

Driver arm 19 is mounted to the shaft 21 of an electric motor 22 (FIG. 1). Driving motor 22 is a small 115 volt 60 cycle instrument motor. Gears within the motor housing reduce the speed of shaft 21 to 20 revolutions per minute. Driving motor 22 is mounted to the interior surface of the web of channel member 25, the latter being apertured to pass shaft 21 therethrough.

Driver arm 19 is spaced away from the exterior surface of the web of channel member 5 and a cylindrical collar 23 (FIG. 1) mounted around shaft 21 concentric therewith and against driver 19 for rotation therewith fits between member 5 and driver 19. Indentations 24, 25 (FIG. 2) are cut into the surface of collar 23. Indentations 24, 25 are placed so as to receive the rollers 26, 27 respectively of two conventional SPDT snap action switches 28, 29 while driver arm 19 is in its rest position which corresponds to the uppermost position of marking unit 7 on guide rod 15. Indentations 24, 25 are spaced apart so that rollers 26, 27 will be supported against the cylindrical surface of collar 24 while driver arm 19 is in some position other than its rest position. Switches 28, 29 will be referred to as actuated while rollers 26, 27 are not in an indentation, and released when rollers 26, 27 are received in indentations 24, 25, respectively.

In the preferred embodiment of this invention, snap action switches 28, 29 are mounted to the exterior surface of the web of member 5 on opposite sides of shaft 21 and collar 23. They are offset relative to each other axially of collar 23 so that their rollers rest on separate circumferential paths about the cylindrical surface of collar 23. Thus roller 26 cannot be received in indentation 25, nor may roller 27 be received in indentation 24. Other conventional cam and snap action switch arrangements may be used so long as the switches are released while driver arm 19 is in its rest position and actuated for all other positions of driver 19, and all such arrangements, including the use of a single cam or indentation and a double pole snap action switch, are contemplated by this invention.

Switch 28 terminates the recording cycle. The cycle is initiated by the momentary closing of a normally open SPST switch 32 by a timing motor 33. The timing motor 33 and switch 32 are parts of a conventional adjustable timing unit. The connections of switches and motors for the device of this invention are shown in FIG. 3.

Input lines 34, 36 are connected to a source of single phase alternating current at 115 volts. A fuse 37 and SPST toggle switch 38 are connected serially between line 34 and line 35. Switch 38 serves to turn the device of this invention on and off. Beyond switch 38, line 35 is connected to the movable contact of switch 28. One terminal of driving motor 22 is connected to line 36, while the other terminal is connected to the normally open contact of SPDT switch 28, that is, the contact engaged by the switch's movable contact when switch 28 is actuated. One terminal of timing motor 33 is connected to line 36, while the other is connected to the normally closed contact of switch 28, that is, the contact engaged by the switch's movable contact when switch 28 is released. Switch 32 is connected between the normally open and normally closed contacts of switch 28.

Thus when driver 19 is in its rest position (collar 23 is shown schematically in its rest position in FIG. 3), current from line 35 is provided to timing motor 33 and timing switch 32, but not to driving motor 22. After timing motor 33 has operated for a predetermined period of time (the desired time between cycles minus 3 seconds, the length of one cycle), switch 32 will be closed momentarily, thus momentarily connecting driving motor 22 to line 35.

Momentary connection of driving motor 22 to line 35 through switch 32 causes the motor to begin to turn, and it turns far enough to cause collar 23 to actuate switch 28 through roller 26 (switch 29, of course, is also actuated). Actuation of switch 28 connects driving motor 22 to line 35, and thus driving arm 19 continues to rotate. Simultaneously, as soon as switch 32 opens, timing motor 33 is disconnected from line 35. As driving arm 19 rotates, marking unit 7 oscillates from a position adjacent the upper edge of recording medium 6 to a position adjacent the lower edge, and then back. As driver 19 and collar 23 complete a revolution, roller 26 falls back into indentation 24, releasing switch 28, disconnecting motor 22 from line 35, and reconnecting timing motor 33 to line 35. Motor 22 stops and driver 19 remains in its rest position until timing motor 33 once again causes closing of switch 32.

Of course, timing motor 33 could be connected directly to line 35, rather than to the normally closed contact of switch 28. However, connection in the manner indicated will make inadvertent setting of the timer to a period of time shorter than the time necessary for a recording cycle impossible.

In the preferred embodiment of this invention, a conventional pressure sensitive paper is used as recording medium 6. Such paper has a white or light colored surface. When direct pressure is applied to any portion or spot on the paper, that portion or spot becomes dark. Thus, striking the paper with a pointed object will produce a dot, while moving a pointed object along the surface of the paper will produce a line.

Recording paper 6 can ordinarily be obtained, or rolled, upon a reel, such as reel 40. Reel 40 fits rotatably on shaft 41, which is supported between angle brackets 42 mounted on one of the flanges of member 5. Recording paper 6 passes from reel 40 over the exterior surface of the web of channel member 5 between angle members 16, 17. The bottom flanges of angle members 16, 17 face towards recording paper 6 and serve as guides preventing the paper from shifting sideways (see FIG. 1).

A sheet of plastic 43 (FIG. 2) fits over a portion of recording paper 6, between the flanges of angle members 16, 17 beginning at the edge of member 5 adjacent reel 40 and terminating just before the vertical line on which marking unit 7 marks. Sheet 43 is held in place by a strip 44 of metal mounted at its ends to angle members 16, 17. Sheet 43 serves to keep paper 6 smooth and properly aligned for marking by marking unit 7.

After passing under marking unit 7, recording paper 6 continues across member 5, then passes over capstan 47 and is taken up by takeup reel 48. Capstan 47 is mounted on shaft 49 which is driven by reel motor 50 at a very low rate of speed, such as one revolution per hour. Reel motor 50 is connected to lines 35, 36, and thus operates only when switch 38 is closed. Capstan 47 has sprocket teeth 51 which engage sprocket holes 52 punched in recording paper 6 adjacent its borders. Thus the capstan accurately controls the transverse movement of recording paper 6 across channel member 5. Take-up reel 48 is secured to a shaft 53 which is parallel to and adjacent shaft 49 (FIG. 2). Shafts 49, 53 are mounted rotatably to brackets 54 which are attached to the exterior surface of the flange of channel member 5 opposite to the flange on which the brackets 42 are mounted. One of brackets 54 supports reel motor 50.

A grooved collar 55 is mounted to the bottom of reel 48 adjacent and in registration with a groove 56 cut in capstan 47 adjacent its lower edge and below teeth 51. An endless coil spring or other slipable belt 57 connects collar 55 and groove 56. Since collar 55 is of smaller diameter than the diameter of groove 56, belt 57 must be able to slip periodically. This arrangement will keep the recording paper 6 between capstan 47 and reel 48 taut regardless of the amount of paper on reel 48.

A guide rod 60 is mounted to angle members 16, 17 parallel to and adjacent guide rod 15. A reference marking unit 61 is slidably mounted on rod 60. Marking unit 61 comprises a plastic block 62, which fits relatively frictionally around rod 60, a handle 63 and pointer 64. Handle 63 and pointer 64 are one unit which is mounted pivotally through block 62 in such a manner that handle 62 will retain either of two positions when placed therein. In the forward position (shown in FIG. 1), pointer 64 engages the surface of recording paper 6, resting hard enough thereagainst to cause the pressure sensitive paper to turn dark. In this position the pointer leaves a horizontal line on the paper. The position of the line can be set where desired by moving unit 61 up or down on guide rod 60; thus the line can be used as a reference line where the paper 6 has no reference grid marked on it. If graph paper is used, such a reference line might still be convenient. When handle 63 is placed in its rearward position, pointer 64 does not engage recording medium 6, and no reference line is placed thereon.

The exact form of marking unit 7 depends upon the type of recording medium 6 which is chosen. For the preferred pressure sensitive paper, the preferred embodiment of marking unit 7 strikes recording paper 6 with a pointed arm in response to the first contact between probe 8 and surface 9 of liquid 10 during a recording cycle.

Referring to FIG. 1, a plastic mounting block 70 is slidably mounted for relatively friction free movement on guide rod 15. One end of connecting rod 18 is pivotally connected to mounting block 70. On the surface of block 70 facing member 5, an electromagnet 71 is fixedly mounted. An armature 72 is mounted pivotally adjacent electromagnet coil 71, and a pointed arm 73 provided with a point 74 forms an extension of said armature. Arm 73 is positioned such that energization of electromagnet 71 and resultant attraction of armature 72 causes point 74 to strike pressure sensitive recording paper 6 sufficiently hard to cause a mark or small dot to appear thereon.

A probe support 65 is fixedly mounted to the side of block 70 facing reel 40. Probe 8 is adjustably mounted to support 65. Thus probe 8 may be fixed in support 65 in a position such that its point is just above the maximum expected height for liquid 10, and the full width of recording medium 6 may be employed for level recording.

Referring to FIG. 3, energization of coil 71 occurs momentarily, when probe 8 first strikes the surface 9 of liquid 10 during a recording cycle, by the discharge of a capacitor 75 through coil 71. One terminal of capacitor 75 is connected to member 5 and to liquid 10 by means of a flexible lead or rod 76. The other terminal of capacitor 75 is connected to one terminal of coil 71, whose other terminal is connected through lead 77 to probe 8. As probe 8 first strikes surface 9 of liquid 10, a discharge circuit for capacitor 75 consisting of coil 71, lead 77, probe 8, liquid 10, and ground lead 76 is completed, and capacitor 75 may discharge through coil 71, causing point 74 to momentarily strike recording paper 6.

Between recording cycles, capacitor 75 is charged by a conventional rectifier circuit 79, the output of which is controlled by collar 23 and switch 29. The rectifier circuit includes a transformer 80, whose secondary is serially connected with a resistor 81, a diode 82 and a filtering capacitor 83. The primary of transformer 80 is connected between input leads 35, 36. One terminal of capacitor 83 (ordinarily the negative terminal) is connected to member 5 and grounding lead 76, and thus to one terminal of capacitor 75. The other terminal of capacitor 83 is connected through the normally engaged contacts of switch 29 to the other terminal of capacitor 75, and thus incidentally to coil 71.

Thus, between recording cycles, capacitor 75 is connected to the output terminals of the charging circuit, that is, across filter capacitor 83. As a recording cycle is initiated by timing switch 32, the connection through switch 29 is broken, and there is no opportunity for the charging circuit to continue to energize coil 71 while probe 8 is immersed in liquid 10.

From the preceding description it is apparent that for operation of the preferred embodiment of this invention, surface 9 of liquid 10 must be capable of conducting electricity. Of course, in many instances, the level of a nonconductive liquid can be recorded by the preferred embodiment by floating a thin layer of conductive liquid thereupon. Liquid 10 need not be of high conductivity because of the relatively high voltage of 250 volts produced by charging circuit 79. If capacitor 75 is charged by a 250 volt D.C. source, a value of 0.25 microfarad will allow said capacitor to store enough current to energize a coil 71 of 10,000 ohms. Because of the higher voltage controlled by switch 29, separate switches 28, 29 are preferred to better insulate the circuits controlled by said switches from each other.

It is apparent from study of FIG. 3 that this invention uses no complex electronic circuits. The most complicated circuit is a conventional rectifier circuit. No servomechanisms are required in this invention. Instead, both marking unit 7 and probe 8 travel a predetermined cyclical path, and no electronic control over their course is necessary.

Of course, in the recording instrument art, alternate devices to the one described above are well known and are contemplated as being within the scope of this invention. The device of this invention may be adapted for use with paper sensitive to electric sparks, or heat, or may be used with ordinary paper and ink pens, where the pen momentarily tourches the paper to make a dot. However, the above described marking unit 7 in combination with pressure sensitive paper is presently deemed to be the most convenient and trouble free recording combination.

In the previously described preferred embodiment, probe 8 is mechanically attached to marking unit 7 and thus the record on medium 6 will be in 1:1 ratio to the recorded variation in the level of liquid 10. In certain instances, it will be desired to produce a record which is at an expanded or compressed scale with respect to the variations in level of liquid 10. The alternate form shown in FIG. 4 and described below produces an expanded scale, but obviously may be adapted to produce a compressed scale or an adjustable choice between expanded, direct, or compressed scale. Where the ratio between the record on medium 6 and the recorded variation of liquid 10 is other than 1:1, it will be termed non-unitary.

The alternate form of the recording device is similar to the previously described preferred embodiment except for the means oscillating the probe into and out of liquid 10. As shown in FIG. 4, the drive motor 22' is equivalent to drive motor 22 and is electrically connected in the same manner, except that the drive shaft 88 of motor 22' protrudes both through the front (to drive collar 23, etc.) and the rear of the motor's housing. A ratio arm 89 is mounted on the rear end of shaft 88 and will be described in greater detail subsequently. A connecting arm 90 is pivotally connected to ratio arm 89 at one end and to a rod 91 at its other end. Rod 91 is held reciprocably in place by sleeve mounts 92, 93, which are fixedly mounted to a housing 94. Housing 94 is mounted to channel member 5, thus enclosing timer 93, charging circuit 79 and capacitor 75. Although not shown in FIGS. 1, 2, the preferred embodiment previously described has a housing similar to housing 94, but without mounts 92, 93.

As shaft 88 rotates, rod 91 reciprocates or completes a full oscillation between an upper and lower position for each rotation of shaft 88. For the expanded scale device shown in FIG. 4, the distance between the upper and lower positions of rod 91 will be less than the distance between the upper and lower positions of marking unit 7 during a recording cycle. Where ratio arm 89 is extended to a greater length than driver arm 19, the distance between the upper and lower positions of rod 91 will be greater than the distance between the upper and lower positions of marking unit 7 during a recording cycle, and a compressed scale device will result.

An insulating block 95 has a short probe 96 mounted on it, and is adapted to slide on rod 91, with probe 96 parallel to rod 91. Lead 77 from coil 71 is connected to probe 96. Thus probe 96 is connected to coil 71 in the same manner as probe 8 is connected to coil 71 in the preferred embodiment, and is insulated from rod 91. Threaded screws 97, threaded in block 95 so as to be engageable with rod 91, may be tightened to hold probe 96 at a desired distance from connecting arm 90. Thus, the height of probe 96 above surface 9 can be adjusted for the same reasons that probe 8 is adjustable.

Ratio arm 89 is provided with several holes 98 so that the position of the connection of connecting arm 90 with ratio arm 89 may be changed, thus changing the ratio between the lengths of the paths of oscillation of marking unit 7, and rod 91 or the tip of probe 96. That is, the effective length of ratio arm 89 is adjustable between several predetermined lengths. If arm 89 is extended to a length greater than the length of driver arm 19, and additional holes 98 are appropriately placed therein, ratios between the length of the oscillation paths of marker 7 and probe 96 of less than or greater than 1:1, as well as 1:1, can be chosen when desired, depending on the extremes of variation of the liquid level being recorded which are expected. If surface 9 cannot vary more than an inch between extremes, it would be desirable to use an expanded ratio so that the resulting record of the variation of surface 9 varies between more convenient limits. If a variation of a foot can occur, a compressed ratio will allow the recorder to make a complete record although at a reduced scale.

There are many places where a record of the rise and fall of a level of water or an electrically conductive fluid is desirable. For example, it is used to obtain records of variations in the height of sewage passing through a sewer, or of water in a conduit. Another use is in the study of the tides, or in the rise and fall of rivers or streams over a period of time.

In the study of tides, for example, the device is supported rigidly spaced above a body of water that is associated with tide water to have a corresponding rise and fall, and the marker will make a series of dots at predetermined uniform time intervals to show the variations in the height of the tide water.

Both the preferred embodiment and the alternate form can be adapted by methods well known to the electrical art to operate from batteries, rather than ordinary line voltage, where such adaptation is preferable, and said adaptation as well as other modifications and adaptations which might appear reasonable or necessary to a person skilled in the art to which this invention pertains are within the spirit of this invention and the scope of the following claims.

I claim:
1. The method of making a record of variations in the level of a liquid body that comprises the steps of:
   (a) oscillating an element between positions above and below the nominal limits of variation of said level;
   (b) continuously moving a surface in a straight line at a determinable rate of speed;
   (c) marking said surface at a point on the same corresponding to the elevation of said element in response to initial contact beween said element and said level during each oscillation of said element.

2. Apparatus for recording the level of a liquid comprising:
   (a) a probe;
   (b) means for oscillating said probe between a first position, above the level of said liquid, and a second position, in which said probe is dipped into said liquid;
   (c) a recording device;
   (d) means connected to said probe and said recording device for generating a recording signal in response to initial contact of said probe with said liquid during oscillation of said probe;
   (e) said recording device recording the position of initial contact of said probe with said liquid in response to said recording signal.

3. Apparatus for recording the level of a liquid comprising:
   (a) a probe;
   (b) oscillating means for oscillating said probe between a first position, above the level of said liquid, and a second position, in which said probe is dipped into said liquid;
   (c) a recording medium;
   (d) marking means connected to said oscillating means for oscillation across said recording medium in relation to oscillation of said probe;
   (e) means connected to said probe and said marking means for generating a marking signal in response to initial contact of said probe with said liquid during oscillation of said probe;
   (f) said marking means marking said recording medium in response to said marking signal.

4. Apparatus for recording the level of a liquid comprising:
   (a) a probe;
   (b) oscillating means for oscillating said probe between a first position, above the level of said liquid, and a second position, in which said probe is dipped into said liquid;
   (c) a recording medium;
   (d) marking means connected to said oscillating means for oscillation across said recording medium in relation to oscillation of said probe;
   (e) an electric circuit completed by contact between said probe and said liquid; and,
   (f) said marking means connected to said electric circuit for marking said recording medium during oscillation of said probe upon initial contact between said probe and said liquid.

5. Apparatus for recording the level of a liquid having an electrically conductive surface comprising:
   (a) a probe;
   (b) oscillating means for oscillating said probe between a first position, above the level of said liquid, and a second position, in which said probe is dipped into said liquid;
   (c) a recording medium;
   (d) marking means connected to said oscillating means for oscillation across said recording medium in relation to oscillation of said probe;
   (e) an electric circuit including:
      (i) a connection to said surface,
      (ii) a capacitor,
      (iii) means charging said capacitor while said probe is in said first position, and
      (iv) means connecting said capacitor and said marking means serially with said connection to said surface and said probe in response to movement of said probe away from said first position;
   (f) said marking means marking said recording medium in response to discharge of said capacitor.

6. Apparatus for recording the level of a liquid having an electrically conductive surface comprising:
   (a) a probe;
   (b) oscillating means for oscillating said probe between a first position, above the level of said liquid, and a second position, in which said probe is dipped into said liquid;
   (c) a recording medium formed of pressure sensitive material;
   (d) marking means connected to said oscillating means for oscillation across said recording medium in relation to oscillation of said probe;
   (e) an electric circuit including:
      (i) a connection to said surface,
      (ii) a capacitor,
      (iii) means charging said capacitor while said probe is in said first position, and
      (iv) means connecting said capacitor and said marking means serially with said connection to said surface and said probe in response to movement of said probe away from said first position;
   (f) said marking means including:
      (i) a solenoid,
      (ii) an armature, provided with a point, and adapted to strike said recording medium with said point upon discharge of said capacitor through said solenoid.

7. Apparatus for recording the level of a liquid comprising:
(a) a marking means;
(b) a probe mechanically attached to said marking means;
(c) oscillating means for oscillating said marking means and said probe between a first position, in which said probe is above the level of said liquid, and a second position, in which said probe is dipped into said liquid;
(d) a recording medium positioned such that said marking means is moved across said recording medium by said oscillating means as said probe is moved from said first position to said second position;
(e) means connected to said probe and said marking means for generating a marking signal in response to initial contact of said probe with said liquid during oscillation of said probe;
(f) said marking means marking said recording medium in response to said marking signal.

8. Apparatus for recording the level of a liquid comprising:
(a) a marking means;
(b) a probe;
(c) a recording medium;
(d) a driving means;
(e) a first mechanism connecting said driving means and said probe for oscillating said probe between a first position, above the level of said liquid, and a second position, in which said probe is dipped into said liquid, in response to operation of said driving means;
(f) a second mechanism connecting said driving means and said marking means for oscillation of said marking means across said recording medium in relation to oscillation of said probe;
(g) means connected to said probe and said marking means for generating a marking signal in response to initial contact of said probe with said liquid during oscillation of said probe;
(h) said marking means marking said recording medium in response to said marking signal.

9. Apparatus for recording the level of a liquid having an electrically conductive surface on a recording medium comprising:
(a) an electric circuit;
(b) marking means for marking indications of said level upon said recording medium in response to completion of said circuit;
(c) means for oscillating said marking means across said recording medium between a first position corresponding to a first point ordinarily above the level of said liquid and a second position corresponding to a second point ordinarily below the level of said liquid;
(d) a probe, having a tip, mechanically attached to said marking means for oscillation of said tip between said points;
(e) said probe connected to said electric circuit for completing the same upon initial contact of said probe with said liquid.

10. Apparatus for recording the level of a liquid having an electrically conductive surface on a recording medium comprising:
(a) an electric circuit;
(b) marking means for marking indications of said level upon said recording medium in response to completion of said circuit;
(c) a driving means;
(d) a first mechanism, connecting said driving means and said marking means, for oscillating said marking means across said recording medium between a first position corresponding to a first point ordinarily above the level of said liquid and a second position corresponding to a second point ordinarily below the level of said liquid in response to operation of said driving means;
(e) a probe, having a tip;
(f) a second mechanism connecting said driving means and said probe for oscillation of said tip between said points in correspondence to oscillation of said marking means;
(g) said probe connected to said electric circuit for completing the same upon initial contact of said probe with said liquid.

11. Apparatus for recording the level of a liquid comprising:
(a) a probe;
(b) oscillating means for oscillating said probe between a first position, above the level of said liquid, and a second position, in which said probe is dipped into said liquid;
(c) a recording medium moving at a determinable rate of speed;
(d) marking means connected to said oscillating means for oscillation across said recording medium in relation to oscillation of said probe;
(e) means connected to said probe and said marking means for generating a marking signal in response to initial contact of said probe with said liquid during oscillation of said probe;
(f) said marking means marking said recording medium in response to said marking signal;
(g) a timer connected to said oscillating means for periodically initiating oscillation of said probe.

12. Apparatus for recording the level of a liquid comprising:
(a) a marking means;
(b) a probe;
(c) a recording medium moving at a determinable rate of speed;
(d) a driving means;
(e) a first mechanism connecting said driving means and said probe for oscillating said probe between a first position, above the level of said liquid, and a second position, in which said probe is dipped into said liquid, in response to operation of said driving means;
(f) a second mechanism connecting said driving means and said marking means for oscillation of said marking means across said recording medium in relation to oscillation of said probe;
(g) means connected to said probe and said marking means for generating a marking signal in response to initial contact of said probe with said liquid during oscillation of said probe;
(h) said marking means marking said recording medium in response to said marking signal;
(i) control means connected to said driving means for periodically operating the same.

13. Apparatus for recording the level of a liquid having an electrically conductive surface comprising:
(a) a probe;
(b) electrically driven oscillating means for oscillating said probe between a first position, above the level of said liquid, and a second position, in which said probe is dipped into said liquid;
(c) a recording medium formed of pressure sensitive material moving at a determinable rate of speed;
(d) marking means connected to said oscillating means for oscillation across said recording medium in relation to oscillation of said probe;
(e) an electric circuit including:
 (i) a connection to said surface,
 (ii) a capacitor,
 (iii) means charging said capacitor while said probe is in said first position, and
 (iv) means connecting said capacitor and said marking means serially with said connection to said surface and said probe in response to movement of said probe away from said first position;
(f) said marking means including:
  (i) a solenoid,
  (ii) an armature, provided with a point, and adapted to strike said recording medium with said point upon discharge of said capacitor through said solenoid;
(g) a control switch, controlling the flow of electricity to said oscillating means, and mechanically connected to said oscillating means in such manner that said switch is open while said probe is in its first position and is closed for all other positions of said probe;
(h) a normally open timing switch electrically connected to said oscillating means to provide electricity to the same while closed,
(i) a timer periodically closing said timing switch for a length of time sufficient for movement of said oscillating means away from a position corresponding to said first position of said probe to occur.

References Cited by the Examiner
UNITED STATES PATENTS

| | | | |
|---|---|---|---|
| 1,611,407 | 12/26 | Berg | 33—126.6 |
| 2,854,752 | 10/58 | Heacock | 33—126.6 |
| 3,100,347 | 8/63 | Fritze | 33—126.6 |

FOREIGN PATENTS

| | | |
|---|---|---|
| 694,737 | 7/53 | Great Britain. |
| 512,266 | 1/55 | Italy. |

ISAAC LISANN, *Primary Examiner*.